United States Patent [19]

Takahashi et al.

[11] 4,157,647

[45] Jun. 12, 1979

[54] HAND REVERSING SYSTEM FOR AN ELECTRONIC TIMEPIECE

[75] Inventors: Norio Takahashi; Teruo Ito, both of Tokyo, Japan

[73] Assignee: Kabushiki Kaisha Daini Seikosha, Japan

[21] Appl. No.: 817,617

[22] Filed: Jul. 21, 1977

[30] Foreign Application Priority Data

Jul. 21, 1976 [JP] Japan .................................. 51/86749

[51] Int. Cl.2 ........................ G04B 27/00; G05B 19/40

[52] U.S. Cl. ..................................... 58/85.5; 58/23 D; 318/696

[58] Field of Search .............. 58/85.5, 23 D; 318/696, 318/685, 138

[56] References Cited

U.S. PATENT DOCUMENTS

| | | | |
|---|---|---|---|
| 3,855,781 | 12/1974 | Chihara | 58/23 D |
| 3,937,003 | 2/1976 | Busch | 58/23 D |
| 3,948,035 | 4/1976 | Kusumoto | 58/85.5 |
| 3,958,167 | 5/1976 | Nakajima | 318/696 |
| 4,028,604 | 6/1977 | Togo | 318/685 |
| 4,032,827 | 6/1977 | Dobratz | 58/23 D |
| 4,037,400 | 7/1977 | Kitai | 58/23 D |
| 4,055,785 | 10/1977 | Nakajima | 318/696 |

*Primary Examiner*—Robert K. Schaefer
*Assistant Examiner*—William L. Feeney
*Attorney, Agent, or Firm*—Robert E. Burns; Emmanuel J. Lobato; Bruce L. Adams

[57] ABSTRACT

In an analogue electronic timepiece the hands are moved by a stepping motor driven by a time standard signal supplied from a generating circuit comprising a quartz oscillator. In order to amend the time in a reverse direction, for example to correct for a different time zone, means is provided for detecting the angular position of the rotor of the motor and for supplying current in the reverse direction to the coil of the motor when the rotor reaches a predetermined angular position so as to cause the motor to rotate in a reverse direction.

15 Claims, 5 Drawing Figures

HAND REVERSING SYSTEM FOR AN ELECTRONIC TIMEPIECE

FIELD OF INVENTION

The present invention relates to a hand reversing system for an electronic timepiece and particularly to a hand reversing system by applying a back electromotive force to the stepping motor of the timepiece.

BACKGROUND OF THE INVENTION

In the conventional type of analogue electronic timepieces there are many problems involved in achieving reverse rotation of of the stepping motor in order to amend the time in a reverse direction. A stepping motor can normally be stepped forward so as to attain a forward time amendment in a short time. However, in order to amend time in a reverse direction it is necessary to stop the motor and wait a period of time equal to the desired amendment. For example in order to amend the time ten seconds in a reverse direction it is necessary to stop the motor and wait ten seconds.

SUMMARY OF THE INVENTION

It is an object of the present invention to eliminate the above noted difficulties and insufficiencies by providing a hand reversing system for an electronic timepiece whereby means is provided for speedily amending an advanced and delayed time condition.

In accordance with the present invention, means is provided for detecting the angular position of the rotor of the stepping motor of the timepiece and for applying an electromotice force to the coil of the motor in a reverse direction at a predetermined angular position of the rotor so as to step the motor in a reverse direction.

BRIEF DESCRIPTION OF DRAWINGS

The nature, objects and advantages of the invention will be more fully understood from the following description in conjunction with the accompanying drawings in which.

DESCRIPTION OF PRIOR ART

Figure 1:
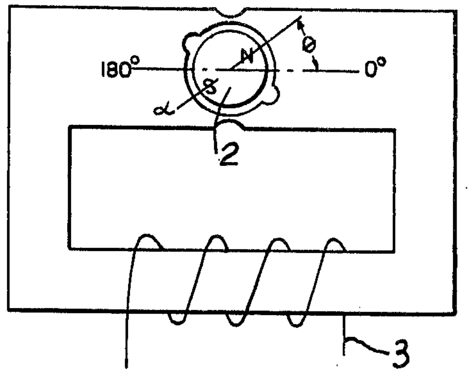
FIG. 1 is a plan view of a conventional stepping motor of an electronic timepiece.

As shown by way of example in FIG. 1, the stepping motor of an electronic timepiece comprises a stator 1 composed of a material of good magnetic permiability, a rotor 2 composed of a permanent magnet and a coil 3 for applying a flux to the stator 1.

Figure 3:
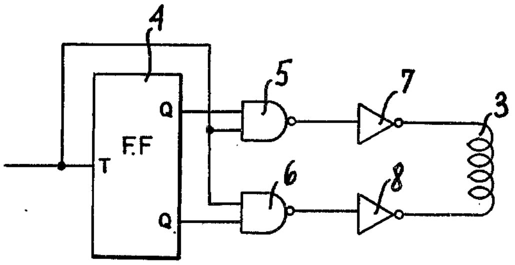
FIG. 3 is a circuit diagram of the driving circuit of a conventional stepping motor.

As shown by way of example in FIG. 3, a driving circuit for the stepping motor of FIG. 1 comprises a flip-flop 4 to the input terminal T of which a time standard signal is applied by a circuit comprising a quartz crystal oscillator and frequency dividers. The coil 3 of the motor is connected to output terminals Q and $\overline{Q}$ and to the time standard signal generating circuit through NAND circuits 5 and 6 and NOT circuits 7 and 8.

Figure 2:
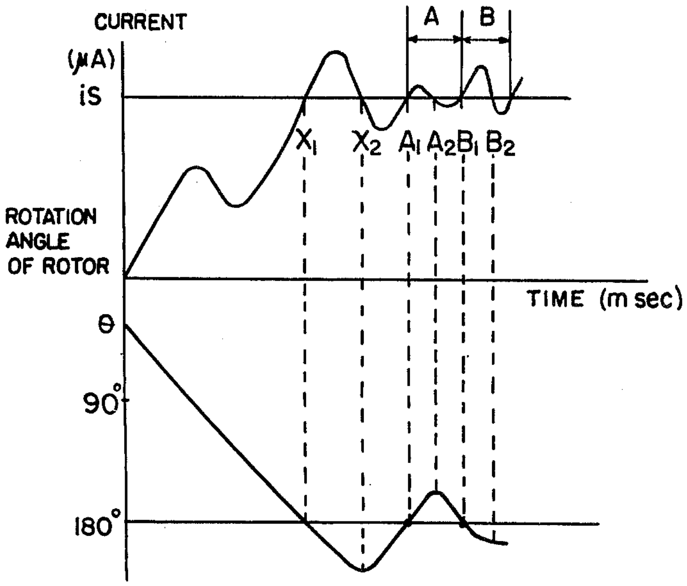
FIG. 2 shows the characteristics of a current wave and the location of the rotor of a stepping motor such as that shown in FIG. 1.

When an electric current is applied to the coil 3 for normally rotating the rotor 2, the electric current in the coil 3 has the form shown in FIG. 2 by reason of self-inductance of the coil 3 and the back electromotive force of rotation of the rotor 2. As a result, the rotor is rotated 180° whereupon vibration occurs about a center which is the magnetic stability point according to the inertia of the rotor 3. This condition is shown by the electric current waveform in FIG. 2. It will be seen that a waveform B is larger than waveform A since the magnetic stability point is located in advance of 180°. Thus the waveform A shows that the rotor 3 goes too far and returns and returns again in front of 180° while the waveform B shows that the rotor 3 overruns 180° and returns to the neighborhood of 180°.

The value of the back electromotive force IS is shown in FIG. 2 as follows:

$$IS = \frac{\text{Power source} - \text{saturation voltage of transistor}}{\text{Direct resistance of coil}}$$

where the transistor comprises NOT circuits 7 and 8. When the current value is equal to IS in FIG. 2, the change ratio of the flux in the stator 1 becomes 0. Each time a signal pulse is applied by the time standard signal generating circuit, the motor is stepped in a forward direction.

DESCRIPTION OF PREFERRED EMBODIMENT

Figure 4:
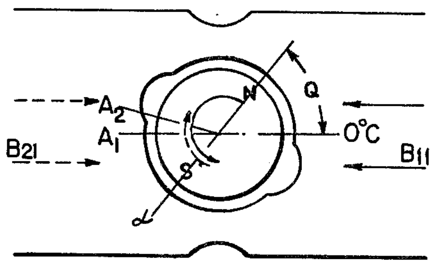
FIG. 4 is a plan view of a stepping motor of the present invention.
Figure 5:
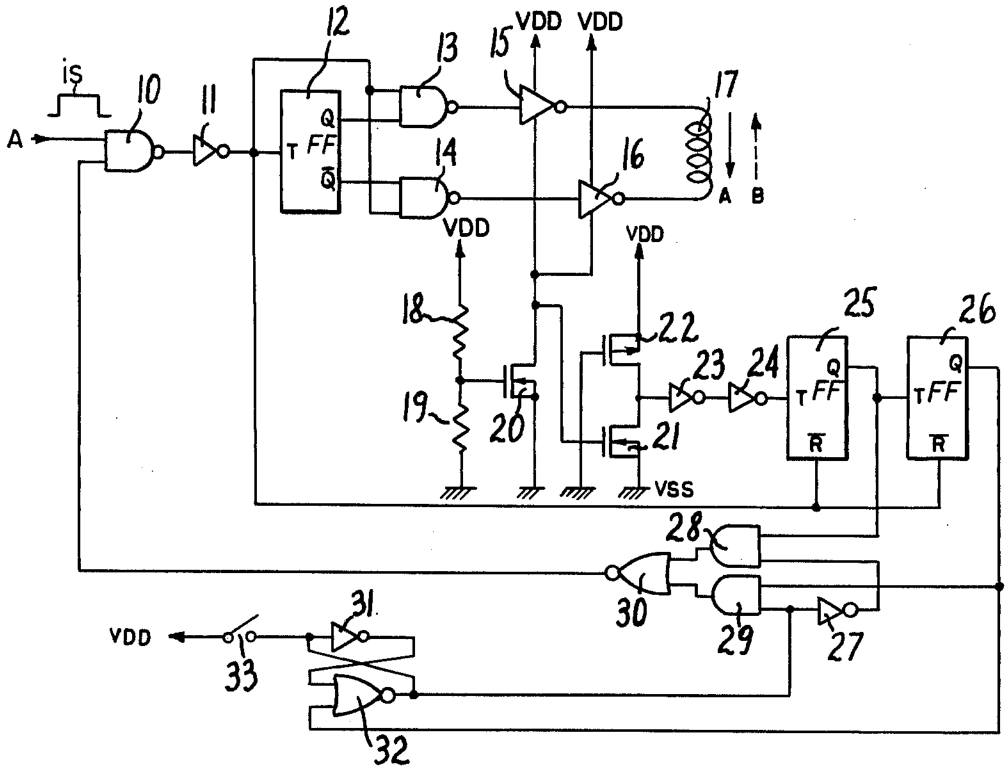
FIG. 5 is a circuit diagram of the driving circuit of the stepping motor of a timepiece in accordance with the present invention.

A stepping motor of an electronic timepiece in accordance with the present invention is shown in FIG. 4 while a driving circuit for the motor is shown in FIG. 5. It will be understood that the stator of the stepping motor of FIG. 4 is provided with a coil for applying flux to the stator. Such coil is shown as coil 17 in FIG. 5.

As shown by way of example in FIG. 5, the driving circuit of the stepping motor shown in FIG. 4 comprises flip-flop circuits 12, 25 and 26. The input terminal of flip-flop circuit 12 is connected with a time standard signal generating circuit through NAND circuit 10 and NOT circuit 11. The driving coil 17 of the stepping motor is connected with the time standard signal generating circuit and with the output terminals of flip-flop circuit 12 through NAND circuits 13 and 14 and NOT circuits 15 and 16.

The circuitry further comprises N-type MOS transistors 20 and 21 and P-type MOS transistor 22 which are connected as shown. A predetermined bias is applied to the gate of MOS transistor 20 by resistors 18 and 19. The common output of transistors 21 and 22 is connected through NOT circuits 23 and 24 with the input of flip-flop circuit 25. The output terminal of flip-flop circuit 25 is connected to the input terminal of flip-flop circuit 26 and the output terminals of flip-flop circuits 25 and 26 are connected as shown to one terminal of AND circuits 28 and 29 the outputs of which are connected through NOR circuit 30 with one of the input terminals of NAND circuit 10. A switch 33 is provided for connecting a voltage source VDD with the input terminal of an R-S flip-flop circuit composed of NOT circuit 31 and NOR circuit 32. The output of flip-flop circuit 26 is connected to one input terminal of NOR circuit 32, while the output of R-S flip-flop circuit is connected to an input terminal of AND circuit 29 and through NOT circuit 27 to an input terminal of AND circuit 28. Reset terminals of flip-flop circuits 25 and 26 are connected to the output of NOT circuit 11.

When voltage is applied to the coil 17 in the direction of the arrow A as shown in FIG. 5, flux is produced in the stator 1 of the stepping motor in the direction B11 as shown in FIG. 4. The rotor 2 of the stepping motor is thereby rotated toward the line of flux B11. Because of its inertia, the rotor starts to vibrate about a center in the neighborhood of the magnetic stability point. Thus when the rotor is located between points A1 and A2 in FIG. 4, it starts to rotate in a reverse direction. If at this time when the rotor has started reverse rotation a reverse flux is applied to the rotor, the reverse rotation is continued.

A stepping motor is normally rotated in one step. If the location of the rotor is detected by the current value which is applied to the coil and the back electromotive force it is possible to rotate the rotor in a reverse direction by applying a reverse current to the coil 17 at a predetermined time.

The operation of the present invention will now be explained with reference to the circuitry shown in FIG. 5.

In rotation of the rotor of the stepping motor in the normal direction, the output Q of the flip-flop circuit 12 is "1" level, the switch 33 is maintained in OPEN condition and the output of NOR circuit 32 is "0" level. When a signal "1" as shown in FIG. 5 is applied to input A, the reset condition of flip-flop circuits 25 and 26 is released by NAND circuit 10 and NOT circuit 11. Further the P-channel MOS transistor which constitutes NOT circuit 15 is turned ON by flip-flop circuit 12 and NAND circuits 13 and 14 and N-channel MOS transistor which constitutes NOT circuit 16 is also turned ON. Therefore a current from the power source VDD is applied to the P-channel MOS transistor, coil 17 and N-channel MOS transistor 20 whereby the stepping motor is driven in a forward direction. The direction of current in coil 17 is indicated by the arrow A.

In this case a bias voltage (VGS) of the transistor 20 is generated by bias resistances 18 and 19. The value of the bias voltage is set so that the saturation current of the transistor 20 becomes equal to IS as indicated in FIG. 2.

When a current as shown in FIG. 2 which is equal to IS is applied to the coil 17 namely when the rotor is rotated 180°, the voltage between the drain and source of the transistor 20 ascends. Then the transistor 21 is turned ON whereby the output is changed from a level "1" to a level "0" by the transistor 22. This signal of a level "0" is applied to the input of flip-flop circuit 25 through NOT circuits 23 and 24. The flip-flop circuit 25 inverts the output of the signal from "0" to "1" and from "$\bar{0}$" to "0". The output of the NOT circuit 11 is changed from "1" to "0" by the output of the flip-flop circuit 25 through NAND circuit 10 to NOT circuit 11. Thereby the flip-flop circuit 12 is inverted and the flip-flop circuits 25 and 26 are reset. The output of NOT circuit 11 is returned to level "0". The P-channel MOS transistor which constitutes NOT circuit 14 is turned ON by this output, the flip-flop circuit 12 and NAND circuits 13 and 14 are simultaneously N-channel MOS transistor which constitutes NOT circuit 15 are turned ON whereby a current in the reverse direction indicated by arrow B is applied to the coil 17 of the motor. Thereafter the above operation will be repeated.

Thus with reference to FIG. 2, the rotor of the stepping motor is rotated in normal direction by applying a current of reverse direction after detecting that the rotor is located at point X1. Furthermore, it is possible to stop the rotor by turning the signal A to a level "0".

The reverse rotation of the rotor of the stepping motor will now be described. When the switch 33 is turned OFF after being turned ON and an input signal A is applied whereby a current is applied to the coil of the stepping motor in the direction of the arrow A as shown in FIG. 5, the rotor of the stepping motor is rotated in normal direction. At this time a current is as shown in FIG. 2 is applied to the coil of the motor by operation of the transistors 20, 21 and 22 and NOT circuits 23 and 24 as described above. However, the output of the R-S flip-flop circuit which is composed of NOT circuit 31 and NOR circuit 32 becomes level "1". The outputs of AND circuit 29 and NOR circuit 30 become level "0" after the counter which is composed of flip-flop circuits 25 and 26 has counted two input pulses. This provides a timing in which an inverted current in direction B flows through the coil when the rotor is between points A1 and A2 whereby rotation in a reverse direction is started. The timing for flowing the inverted current is between X1–X2 after rotation in a reverse direction is started. The R-S flip-flop 31, 32 is reset by the output of the flip-flop circuit 26 whereby rotation of the motor in a reverse direction is continued. Rotation in a reverse direction can be stopped by turning the input signal A to level "0".

Actually the rotor is normally or reversely rotated for a certain time, i.e. a certain number of steps, by counting the output pulses by the counter. Further it is possible to reduce the power consumption by providing a switching element between resistors 18 and 19. It is necessary to employ the outer resistor instead of load transistor 22 for increasing the accuracy of setting the level IS.

In accordance with the present invention, it is possible to correct one second time in a reverse direction in less than 20 ms in contrast with a conventional stepping motor in which it required one second to make a one second time correction.

Further in an analogue-type quartz watch it is possible to provide an international timepiece since time advancing or delay of one hour or several hours for different time zones can be accomplished by only one switch whereby it is possible to adjust the time for any place in the world.

Furthermore, the pulse width of the motor driving signal is automatically adjusted according to the load of the rotor since the circuit of the present invention detects the location of rotation of the rotor and supplies current accordingly. Thus minimum current is applied to the coil whereby long battery life is attained and correction of time in either direction is easily effected.

What is claimed is:

1. An electronic timepiece having means for selectively resetting in a forward or in a reverse direction, comprising a stepping motor having a stator, a coil on said stator for producing magnetic flux and a rotor which is rotatable through 180° when current in a given direction is supplied to said coil and which by reason of its inertia overruns the 180° point and then returns toward said point, a power source for said motor, means providing a standard time signal, a motor circuit including means controlling the supply of current from said power source to said coil and the direction of said current comprising a NAND circuit having one input connected with said time signal means and a flip-flop circuit having an input connected with the output of said NAND circuit and operable by an input signal from said time signal means to supply current to said coil in a predetermined direction to rotate said rotor, a counting circuit having two output terminals providing different counts, means responsive to a predetermined current through said coil to initiate the counting of said counting circuit, a selecting circuit for selectively transmitting the output of one or the other of said output terminals of said counting circuit to another input of said NAND circuit to reverse said flip-flop circuit, and manually operable means controlling the operation of said selecting circuit and operable in one condition to transmit the output of one output terminal of said counting means to said NAND circuit to reverse the current in said coil when the rotor has turned 180° so as to continue rotation of said rotor in the same direction and operable in another condition to transmit the output of said other output terminal of said counting circuit to said NAND circuit to reverse the current in said coil when the rotor has overrun the 180° point and is returning to the neighborhood of 180° so as to drive the rotor in a reverse direction.

2. An electronic timepiece according to claim 1, in which said selecting circuit comprises two AND circuits having one input connected respectively with said output terminals of said counting circuit, and said controlling means comprises an R-S flip-flop circuit having an output connected with another terminal of one of said AND circuits and connected through a NOT circuit with another terminal of the other of said AND circuits and a manually operable switch controlling said R-S flip-flop circuit.

3. An electronic timepiece according to claim 2, in which said selecting circuit further comprises a NOR circuit having one input connected to the output of one of said AND circuits, another input connected to the output of the other of said AND circuits and an output connected with an input of said NAND circuit.

4. An electronic timepiece according to claim 1, in which said current responsive means comprises a MOS transistor connected with said motor circuit and means applying a selected bias to the gate of said transistor.

5. An electronic timepiece according to claim 4, in which said MOS transistor is connected with said counting circuit through a pair of complemental MOS transistors of which one has a gate connected with the output of said first mentioned MOS transistor, the output of said pair of MOS transistors being connected with said counting circuit.

6. An electronic timepiece according to claim 5, in which the output of said pair of MOS transistors is connected with said counting circuit through two NOT circuits connected in series with one another.

7. An electronic timepiece according to claim 1, in which said counting circuit comprises a plurality of flip-flop circuits connected with one another in cascade.

8. An electronic timepiece according to claim 7, in which the output of said NAND circuit is connected with reset terminals of said flip-flop circuits comprising said counting circuit.

9. An electronic timepiece according to claim 1, in which said flip-flop circuit has Q and $\overline{Q}$ output terminals connected respectively through a NAND circuit and a NOT circuit with opposite ends of said coil.

10. An electronic timepiece having means for selective resetting in a forward or in a reverse direction, comprising a stepping motor having a stator, a coil on said stator for producing magnetic flux and a rotor which is rotatable through 180° when current in a given direction is supplied to said coil and which by reason of its inertia overruns the 180° point and then returns toward said point, a power supply for said motor, means providing a standard time signal, a motor circuit including means controlling the supply of current from said power source to said coil and the direction of said current comprising a first NAND circuit having one input connected with said time signal means, a flip-flop circuit having an input terminal, and Q and $\overline{Q}$ output terminals, a first NOT circuit connecting said input terminal of said flip-flop circuit with the output of said first NAND circuit, a second NAND circuit having one input connected with said Q output terminal of said flip-flop circuit, a second input connected with the output of said first NOT circuit and an output connected with one end of said coil through a second NOT circuit, a third NAND circuit having one input connected with said $\overline{Q}$ output terminal of said flip-flop, a second input connected with the output of said first NOT circuit and an output connected through a third NOT circuit with the other end of said coil, a counting circuit having two output terminals providing different counts, means responsive to a predetermined current through said coil to initiate the counting of said counting circuit, said current responsive means comprising an MOS transistor connected in series with said second and third NOT circuits with said power source and means providing a selected bias to the gate of said MOS transistor, a selecting circuit for selectively transmitting the output of one or the other of said output terminals of said counting circuit to another input of said first NAND circuit, and manually operable means controlling the operation of said selecting circuit and operable in one condition to transmit the output of one output terminal of said counting means to said first NAND circuit to reverse the current in said coil when the rotor has turned 180° so as to continue rotation of said rotor in the same direction and operable in another condition to transmit the output of said other output terminal of said counting circuit to reverse the current in said coil when the rotor has overrun the 180° point and is returning to the neighborhood of 180° so as to drive the rotor in a reverse direction.

11. An electronic timepiece according to claim 10, in which the output of said MOS transistor is connected with a gate of one of a pair of complemental MOS transistors the output of which is connected with an input of said counting circuit.

12. An electronic timepiece according to claim 11, in which the output of said pair of complemental MOS transistors is connected with said input of said counting circuit through two NOT circuits connected in series with one another.

13. An electronic timepiece according to claim 10, in which said selecting circuit comprises two AND circuits having one input connected respectively with said output terminals of said counting circuit and a NOR circuit having inputs connected with outputs of said AND circuits and an output connected with an input of said first NAND circuit, and said controlling means comprises an R-S flip-flop circuit having an output connected to another terminal of one of said AND circuits and connected through a NOT circuit with another terminal of the other of said AND circuits and a manually operable switch for controlling said R-S flip-flop circuit.

14. An electronic timepiece according to claim 10, in which said counting circuit comprises a plurality of flip-flop circuits connected with one another in cascade.

15. An electronic timepiece according to claim 13, in which an input of said R-S flip-flop circuit is connected with an output of a flip-flop circuit of said counting circuit which is the last in said cascade.

* * * * *